United States Patent
Yu et al.

(10) Patent No.: US 8,805,915 B2
(45) Date of Patent: Aug. 12, 2014

(54) FUSED MULTIPLY-ADD APPARATUS AND METHOD

(75) Inventors: Hyeong-Seok Yu, Seoul (KR); Dong-Kwan Suh, Hwaseong (KR); Suk-Jin Kim, Seoul (KR); San Kim, Seoul (KR); Yong-Surk Lee, Seoul (KR)

(73) Assignees: Samsung Electronics Co., Ltd., Suwon-si (KR); Industry-Academic Cooperation Foundation, Yonsei University, Seoul (KR)

(*) Notice: Subject to any disclaimer, the term of this patent is extended or adjusted under 35 U.S.C. 154(b) by 585 days.

(21) Appl. No.: 13/153,885

(22) Filed: Jun. 6, 2011

(65) Prior Publication Data

US 2012/0124117 A1    May 17, 2012

(30) Foreign Application Priority Data

Nov. 17, 2010  (KR) .......................... 10-2010-0114564

(51) Int. Cl.
*G06F 7/38*   (2006.01)

(52) U.S. Cl.
USPC ...................................................... 708/501

(58) Field of Classification Search
CPC ... G06F 7/5443; G06F 7/483; G06F 7/49936; G06F 2207/3884; G06F 5/012; G06F 2207/3828; G06F 7/5324; G06F 7/5338; G06F 9/3001
USPC .................................................. 708/501, 523
See application file for complete search history.

(56) References Cited

U.S. PATENT DOCUMENTS

| 6,363,476 B1 | 3/2002 | Ide |
| 6,427,159 B1 | 7/2002 | Giaume |

(Continued)

FOREIGN PATENT DOCUMENTS

| JP | 2000-57126 | 2/2000 |
| KR | 10-0675993 | 1/2007 |
| KR | 10-2007-0085755 | 8/2007 |
| KR | 10-2009-0060207 | 6/2009 |

OTHER PUBLICATIONS

Chichyang Chen et al., "Architectural Design of a Fast Floating-Point Multiplication-Add Fused Unit Using Signed-Digit Addition", Euromicro Symposium on Digital Systems Design (DSD'01). 2001, pp. 0346-0353.

(Continued)

*Primary Examiner* — Tan V. Mai
(74) *Attorney, Agent, or Firm* — NSIP Law

(57) ABSTRACT

A fixed multiply-add (FMA) apparatus and method are provided. The FMA apparatus includes a partial product generator configured to generate a partial sum and a partial carry, a carry save adder configured to generate a partial sum having a first bit size and a partial carry having the first bit size by adding the partial sum and the partial carry to least significant bits (LSBs) of the mantissa of a third floating-point number, a carry select adder configured to generate a mantissa having a second bit size by adding the first bit-size partial sum and the first bit-size partial carry to most significant bits (MSBs) of the third floating-point number, and a selector configured to transmit the first bit-size partial sum and the first bit-size partial carry to the carry save adder or the carry select adder according to whether the mantissa of the third floating-point number is zero.

20 Claims, 5 Drawing Sheets

(56) References Cited

U.S. PATENT DOCUMENTS

| | | |
|---|---|---|
| 7,225,323 B2 | 5/2007 | Siu et al. |
| 7,240,184 B2 | 7/2007 | Siu et al. |
| 7,428,566 B2 | 9/2008 | Siu et al. |
| 2006/0101244 A1 | 5/2006 | Siu et al. |
| 2009/0150654 A1 | 6/2009 | Oberman et al. |
| 2009/0248779 A1* | 10/2009 | Brooks et al. .......... 708/523 |

OTHER PUBLICATIONS

Erdem Hokenek et al., "Second-generation RISC floating point with multiply-add fused", IEEE Journal of Solid-State Circuits, Oct. 1990, pp. 1207-1213, vol. 25, No. 5, IEEE.

* cited by examiner

FUSED MULTIPLY-ADD APPARATUS AND METHOD

CROSS-REFERENCE TO RELATED APPLICATION(S)

This application claims the benefit under 35 U.S.C. §119(a) of Korean Patent Application No. 10-2010-0114564, filed on Nov. 17, 2010, in the Korean Intellectual Property Office, the entire disclosure of which is incorporated herein by reference for all purposes.

BACKGROUND

1. Field

The following description relates to a fused multiply-add (FMA) apparatus and method, and more particularly, a FMA apparatus and method that are capable of simplifying an FMA.

2. Description of the Related Art

Floating-point units (FPUs) are high-performance units that are capable of processing a is considerable amount of data and are widely used in various fields, for example, computer numerical control, robot control, embedded microprocessor applications, and the like. The demand for a fast, precise fused multiply-add (FMA) technique has steadily grown especially in the fields of wireless communication systems, mobile multimedia systems, three-dimensional (3D) TVs, 3D mobile games, and the like.

An FMA is a floating-point multiply-add operation that is specified in the Institute of Electrical and Electronics Engineers (IEEE) 754 standard, which is an international standard for floating-point arithmetic. An example of floating-point arithmetic is an operation that computes the product of two floating-point numbers (i.e., B and C) and adds the result of the computation to another floating-point number (i.e., A). Even where not necessary to perform the addition step or the multiplication step, however, in conventional methods the add and multiply operations are always performed during an FMA even when they are unnecessary.

SUMMARY

In one general aspect, there is provided a fused multiply-add (FMA) apparatus including a partial product generator configured to generate a partial sum and a partial carry by dividing each of the mantissas of first and second floating-point numbers into a plurality of n-bit segments, computing partial products of the n-bit segments, and adding up the computed partial products, a carry save adder configured to generate a partial sum that has a first bit size and a partial carry that has the first bit size by adding the partial sum and the partial carry to the least significant bits (LSBs) of a mantissa of a third floating-point number, a carry select adder configured to generate a mantissa that has a second bit size by adding the first bit-size partial sum and the first bit-size partial carry to the most significant bits (MSBs) of the third floating-point number, and a first selector configured to transmit the partial sum and the partial carry to the carry save adder or the carry select adder based on whether the mantissa of the third floating-point number is zero.

The FMA apparatus may further comprise a bit aligner configured to align the mantissa of the third floating-point number to the second bit size, output the LSBs of the mantissa of the third floating-point number to the carry save adder, and output the MSBs of the mantissa of the third floating-point number to the carry select adder, a bit extender configured to extend the MSBs of the mantissa of the third floating-point number and output the extended MSBs to the carry select adder, and a second selector configured to transmit the mantissa of the third floating-point number to the bit aligner or the bit extender based on whether the mantissa of the third floating-point number is zero.

The FMA apparatus may further comprise a sign determiner configured to determine whether the second bit-size mantissa is signed or unsigned, a complement generator configured to convert the second bit-size mantissa into its complement number if the second bit-size mantissa is signed, a storage configured to store the second bit-size mantissa therein, and a third selector configured to transmit the second bit-size mantissa to the complement generator or the storage based on whether the mantissa of the third floating-point number is zero.

The FMA apparatus may further comprise a normalizer configured to generate a mantissa that has a third bit size by normalizing the second bit-size mantissa stored in the storage to a third bit size, a rounding determiner configured to determine whether the second bit-size mantissa has been rounded up during the normalization performed by the normalizer, wherein, if the second bit-size mantissa has been rounded up during the normalization performed by the normalizer, the rounding determiner outputs a predefined third bit-size mantissa, and a fourth selector configured to select one of the third bit-size mantissa provided by the normalizer and the third bit-size mantissa provided by the rounding determiner.

The FMA apparatus may further comprise a comparator configured to determine whether a number of LSBs of the second bit-size mantissa are all one and whether the second bit-size mantissa has been rounded up during the normalization performed by the normalizer, and a fifth selector configured to select one of the third bit-size mantissa selected by the fourth selector and a third-bit size mantissa having all bits set to zero, based on the results of the determination performed by the comparator.

The first bit size may be two times greater than the bit size of a double-precision number.

The second bit size may be three times greater than the bit size of a double-precision number.

The third bit size may be the same as or greater than the bit size in of a mantissa of a double-precision number.

In another aspect, there is provided an FMA method including generating a partial sum and a partial carry by dividing each of the mantissas of first and second floating-point numbers into a plurality of n-bit segments, computing partial products of the n-bit segments, and adding up the computed partial products, determining whether the mantissa of a third floating-point number is zero, if the mantissa of the third floating-point number is zero, generating a partial sum that has a first bit size and a partial carry that has the first bit size by adding the partial sum and the partial carry to the LSBs of the mantissa of the third floating-point number, and extending the MSBs of the mantissa of the third floating-point number, and generating a mantissa that has a second bit size by adding the first bit-size partial sum and the first bit-size partial carry to the extended MSBs.

The FMA method may further comprise determining whether the LSBs of the second bit-size mantissa are all one, normalizing the second bit-size mantissa to a third bit size and is determining whether the second bit-size mantissa has been rounded up, and if the LSBs of the second bit-size mantissa are all one and the second bit-size mantissa has been rounded up, outputting a mantissa having the third bit size and that has all bits set to zero.

The first bit size is two times greater than the bit size of a double-precision number.

The second bit size may be three times greater than the bit size of a double-precision number.

The third bit size may be the same as or greater than the bit size of a mantissa of a double-precision number.

In another aspect, there is provided a fused multiply-add (FMA) apparatus including a partial product generator that generates a partial product and a partial carry based on a mantissa of a first floating-point number and a mantissa of the second floating-point number, a carry save adder that adds the partial sum and the partial carry to one or more least significant bits (LSBs) of a third floating-point number to generate a first bit-size partial sum and a first bit-size partial carry, a carry select adder that adds the partial sum and partial carry to one or more most significant bits (MSBs) of the third floating point number or adds the first bit-size partial carry and the first bit-size partial sum to the one more MSBs of the third floating-point number, to generate a second bit-size partial sum and a second bit-size partial carry, a storage that temporarily stores the second bit-size partial sum and the second bit-size partial carry, and a selector that receives a signal that indicates whether the LSBs of the third floating-point number are zero, and determines whether to transmit the partial sum and the partial carry to the carry save adder or the carry select adder based on the received signal.

If the selector receives a signal that indicates the LSBs of the third floating-point number are all zero, the selector may skip the carry save adder and may transmit the partial sum and the partial carry to the carry select adder.

If the selector receives a signal that indicates the LSBs of the third floating-point number are not all zero, the selector may transmit the partial sum and the partial carry to the carry save adder.

Other features and aspects may be apparent from the following detailed description, the drawings, and the claims.

Figure 1:
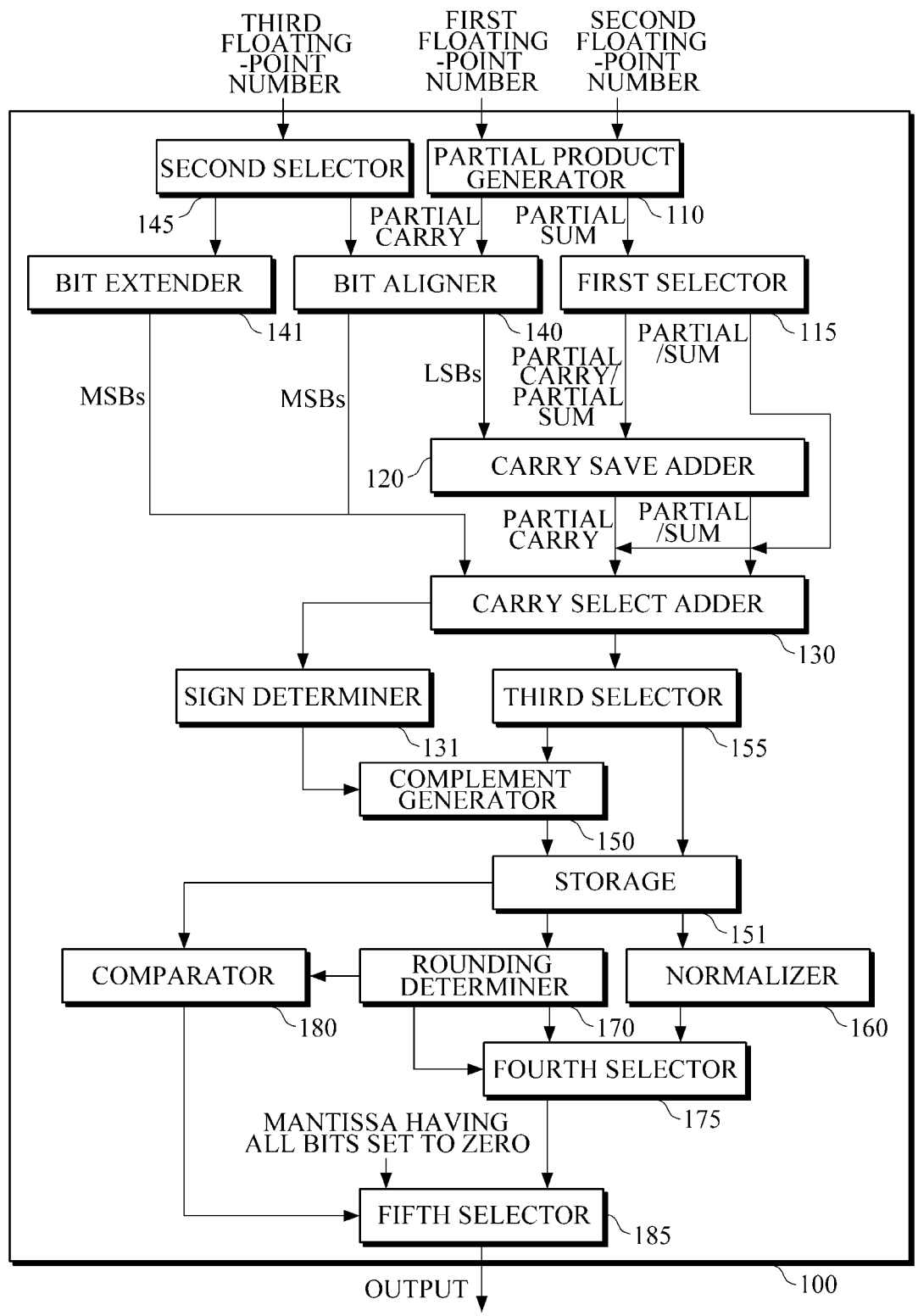
FIG. 1 is a diagram illustrating an example of a fused multiply-add (FMA) apparatus.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a fused multiply-add (FMA) apparatus.

Referring to FIG. 1, an FMA apparatus 100 includes a partial product generator 110, a first selector 115, a carry save adder 120, and a carry select adder 130. The partial product generator 110 is a computation module that is capable of performing a multiply operation. For purposes of example, the partial product generator 110 may use a radix 8 booth 53×53 array multiplier to compute a 64-bit mantissa (i.e. a coefficient of floating-point numbers). In this example, the partial product generator 110 may receive the mantissas of a first and a second floating-point number. For example, the FMA apparatus 100 may receive the first and second floating-point numbers and a third floating-point number, may add the first and second floating-point numbers, and may add the result to the third floating-point number. In this example, the FMA apparatus 100 adds the product of the first and second floating-point numbers to the third floating-point number.

The formats of the first, second, and third floating-point numbers may follow an IEEE 754 standard, which is an international standard for floating-point arithmetic. According to the IEEE 754 standard, a single-precision floating-point number consists of a total of 32 bits. Of the 32 bits, the single-precision floating-point number includes one sign bit, eight exponent bits, and twenty three mantissa bits. Another example is a double-precision floating-point number that consists of a total of 64 bits. Of the 64 bits, the double-precision floating-point number includes one sign bit, eleven exponent bits, and fifty two mantissa bits.

The partial product generator 110 may divide the mantissas of the first and second floating-point numbers into a plurality of segments, for example, a plurality of n-bit segments. The partial product generator 110 may compute the partial products of the n-bit segments of the mantissa of the first floating-point number and the n-bit segments of the mantissa of the second floating-point number. The partial product generator 110 may add the computed partial products to generate a partial sum and a partial carry. The partial product generator 110 may transmit the partial sum and the partial carry to the first selector 115. In this example, the first selector 115 may transmit the partial sum and the partial carry to the carry save adder 120 and/or the carry select adder 130.

The carry save adder 120 is a computation module that has an add function. An example of a carry save adder that may be used as the carry save adder 120 is a 3 to 2 carry save adder. In this example, the carry save adder 120 may add the partial sum and the partial carry provided by the partial product generator 110 to one or more of the least significant bits (LSBs) of the third floating-point number, and may output the result of the addition to the carry select adder 130. For example, the carry save adder 120 may receive the mantissas of the first, second, and third floating-point numbers, and may output a new partial sum and a new partial carry. The new partial sum and the new partial carry may have a first bit size. For example, the first bit size may be two times greater than the bit size of a double—precision floating-point number.

The carry select adder 130 is a computation module that has a fast 'add' function. An example of the carry select adder that may be used as the carry select adder 130 is a 161 bit hybrid carry select adder. For example, the carry select adder 130 may add the first bit-size partial sum and the first bit-size partial carry provided by the carry save adder 120 to one or more of the most significant bits (MSBs) of the mantissa of the third floating-point number. The mantissa of the third floating-point number may be divided into a number of LSBs that are input to the carry save adder 120 and a number of MSBs that are input to the carry select adder 130.

The carry select adder 130 may add the first bit-size partial sum and the first bit-size partial carry to the MSBs of the mantissa of the third floating-point number to generate a second bit-size mantissa. For example, the second bit size may be two times greater than the bit size of a double-precision floating-point number.

The first selector 115 may include a demultiplexer that receives a single input and provides two or more outputs. The first selector 115 may transmit the partial sum and the partial carry provided by the partial product generator 110 to the carry save adder 120 and/or the carry select adder 130. The first selector 115 may receive a signal that indicates whether the mantissa of the third floating-point number is zero. For example, if the mantissa of the third floating-point number is zero, the FMA apparatus 100 may simply multiply the first and second floating-point numbers.

In this example, when the mantissa of the third floating-point number is zero, each bit of the mantissa of the third-floating point number is zero. Accordingly, the LSBs of the mantissa of the third floating-point number do not mathematically alter the result of the whole FMA. For example, when the mantissa of the third floating-point number is zero, the first selector 115 may transmit the partial sum and the partial carry provided by the partial product generator 110 to the carry select adder 130. As another example, if the mantissa of the third floating-point number is not zero, the first selector 115 may transmit the partial sum and the partial carry provided by the partial product generator 110 to the carry save adder 120. By skipping the carry save adder 120 when the mantissa of the third floating-point number is zero, it is possible to reduce the power consumption of the FMA apparatus 100 and improve the processing speed of the FMA apparatus 100 by avoiding unnecessary computation processes.

In the example of FIG. 1, the FMA apparatus 100 also includes a bit aligner 140, a bit extender 141, and a second selector 145.

The bit aligner 140 may align the bits of the mantissa of the third floating-point number to the second bit size to obtain a second bit-size mantissa. For example, the bit aligner 140 may invert the bits of the mantissa of the third floating-point number, and may align the inverted bits of the mantissa of the third floating-point number to the second bit size. For example, the second bit size may be three times greater than the size in bits of a double-precision number.

As an example, if the second bit size is 161 and the mantissa of the third floating-point number is 53 bits long, the mantissa of the third floating-point number may be converted into a 161-bit mantissa through bit alignment. The bit aligner 140 may align the mantissa of the third floating-point number to the second bit size to obtain or otherwise generate a second bit-size mantissa. Subsequently, the bit aligner 140 may divide the second bit-size mantissa into one or more LSBs and one or more MSBs. The bit aligner 140 may output the LSBs of the second bit-size mantissa to the carry save adder 120 and the MSBs of the second bit-size mantissa to the carry select adder 130.

The bit extender 141 may add one or more zeros to the mantissa of the third floating-point number. As described above, the bit aligner 140 may align the mantissa of the third floating-point number to the second bit size to generate a second bit-size mantissa. The second bit-size mantissa may be divided into MSBs and LSBs.

For example, if the second bit size is 161, the second bit-size mantissa may have 55 MSBs and 106 LSBs. If the third floating-point number is a double-precision number, its mantissa may originally have a total of 53 MSBs including 52 mantissa bits and an overflow bit. To increase the number of MSBs of the mantissa of the third floating-point number from 53 to 55, the bit extender 141 may add two additional bits to the mantissa of the third floating-point number. That is, in these examples, the bit extender 141 may add one or more bits to the mantissa of the third floating-point number to extend the mantissa of the third floating-point number. The bit extender 141 may output the extended mantissa of the third floating-point number to the carry select adder 130.

The second selector 145 may include a demultiplexer that receives a single input and provides two or more outputs. The second selector 145 may output the mantissa of the third floating-point number to the bit aligner 140 and/or the bit extender 141. For example, the second selector 145 may receive a signal that indicates whether the mantissa of the third floating-point number is zero. If the received signal indicates that the mantissa of the third floating-point number is not zero, the second selector 145 may output the mantissa of the third floating-point number to the bit extender 141. As another example, if the received signal indicates that the mantissa of the third floating-point number is zero, the second selector 145 may output the mantissa of the third floating-point number to the bit aligner 140.

In this example, when the mantissa of the third floating-point number is zero, each bit of the mantissa of the third-floating point number is zero. Accordingly, the LSBs of the mantissa of the third floating-point number do not mathematically alter the result of the whole FMA. In this example, the alignment of the bits of the mantissa of the third floating-point number by the bit aligner 140 may be skipped. Therefore, it is possible to reduce the power consumption of the FMA apparatus 100 and improve the processing speed of the FMA apparatus 100 by avoiding unnecessary computation processes.

The FMA apparatus 100 also includes a sign determiner 131, a complement generator 150, a storage 151, and a third selector 155.

The sign determiner 131 may receive sign information of the second bit-size mantissa of the third floating-point number from the carry select adder 130. For example, the sign determiner 131 may determine whether the second bit-size mantissa is signed or unsigned based on the MSBs of the second bit-size mantissa. In various aspects, floating-point numbers may be represented in sign magnitude, and are thus not signed. However, the third floating-point may become signed due to overflow that occurs during the extension of the mantissa of the third floating-point number. The sign determiner 131 may transmit the received sign information to the complement generator 150.

The complement generator 150 is a logic module that may convert the second bit-size mantissa into a complement number. For example, in response to the sign information of the second bit-size mantissa being received, the complement generator 150 may convert the second bit-size mantissa into its complement number, and may output the complement number to the storage 151. If the second bit-size mantissa is unsigned, the complement generator 150 may directly output the second bit-size mantissa to the storage 151 without converting it into a complement number. The storage 151 is a memory that may temporarily store data such as the second bit-size mantissa.

The third selector 155 may include a demultiplexer that receives a single input and provides two or more outputs. The third selector 155 may receive the second bit-size mantissa from the carry select adder 130 and may transmit the second bit-size mantissa to the complement generator 150 or the storage 151. In various aspects, the third selector 155 may also receive a signal that indicates whether the second bit-size mantissa is zero. If the second bit-size mantissa is zero, then each of the MSBs of the second bit-size mantissa is zero.

Thus, the second bit-size mantissa cannot be signed during a multiply operation. In this example, there is no need to compute the complement of the second bit-size mantissa.

Accordingly, if the second bit-size mantissa is zero, the third selector 155 may output the second bit-size mantissa directly to the storage 151 and not to the complement generator 150. As another example, if the second bit-size mantissa is not zero, the third selector 155 may output the second bit-size mantissa to the complement generator 150. Therefore, it is possible to reduce the power consumption of the FMA apparatus 100 and improve the processing speed of the FMA apparatus 100 by avoiding unnecessary computation processes. Various aspects to improve the processing speed of the FMA apparatus 100 during a multiply operation are described with reference to FIG. 2A.

Figure 2A:
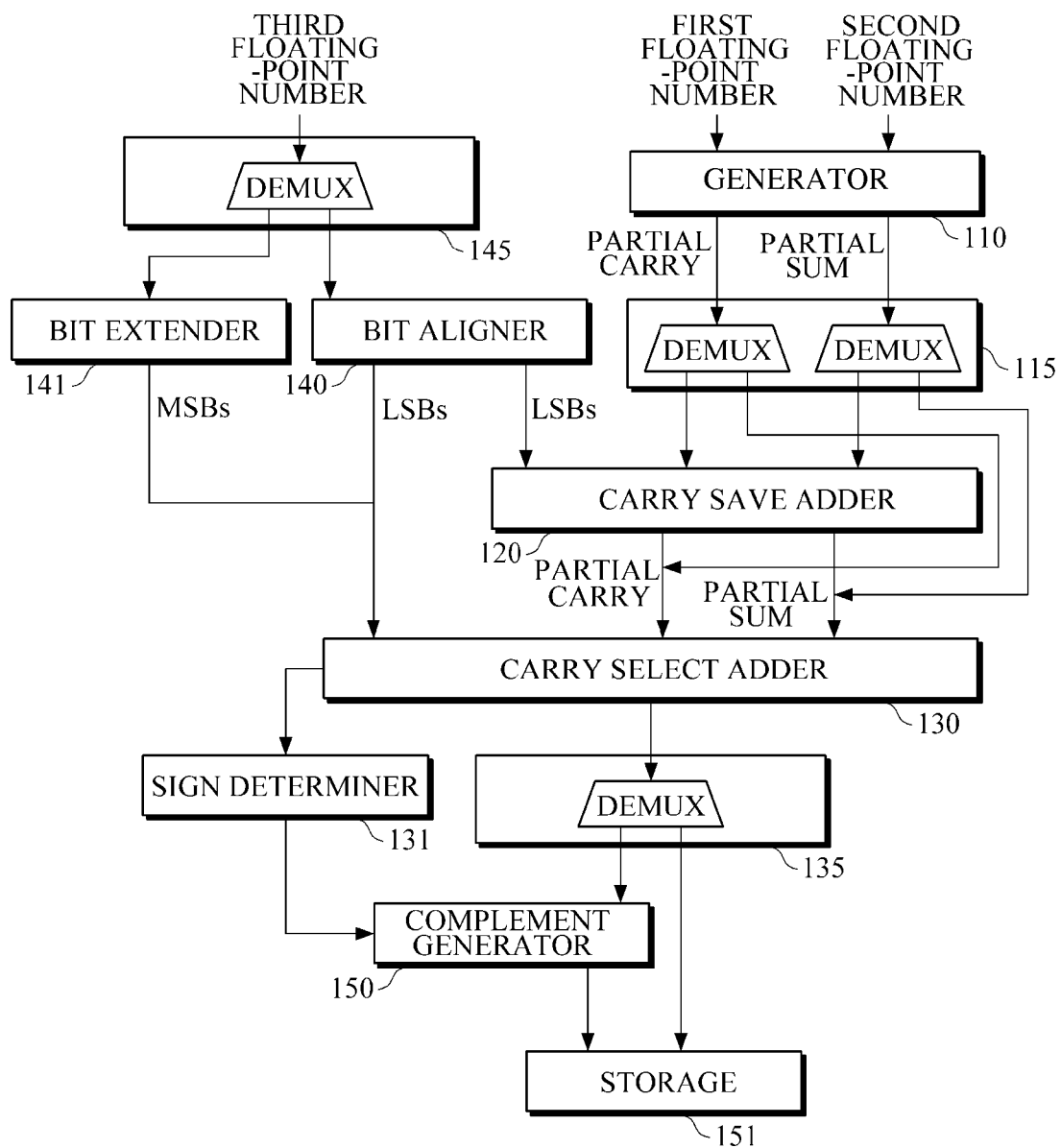
FIG. 2A is a diagram illustrating an example of a multiply module of a FMA apparatus.

FIG. 2A illustrates an example of a multiply operation-processing module of an FMA apparatus.

Referring to FIG. 2A, the first selector 115 may include two demultiplexers, for example, one demultiplexer that may receive a partial sum from the partial product generator 110 and may transmit the partial sum to the carry save adder 120 or the carry select adder 130. The other demultiplexer may receive a partial carry from the partial product generator 110 and may transmit the partial carry to the carry save adder 120 or the carry select adder 130. If the mantissa of the third floating-point number is not zero, the first selector 115 may transmit the partial sum and the partial carry directly to the carry select adder 130.

In this example, the second selector 145 may transmit the mantissa of the third floating-point number to the bit extender 141 or the bit aligner 140 based on whether the mantissa of the third floating-point number is zero. For example, if the mantissa of the third floating-point number is zero, the second selector 145 may transmit the mantissa of the third floating-point number to the bit extender 141, thus, skipping the process of aligning the mantissa of the third floating-point number that is performed by the bit aligner 140.

The third selector 155 may receive a second bit-size mantissa from the carry select adder 130 and may transmit the second bit-size mantissas of the third floating-point number to the complement generator 150 or the storage 151. For example, if the second bit-size mantissa of the third floating-point number is zero, the processes of determining the sign of the second bit-size mantissas of the third floating-point number and computing the one's complement of the second bit-size mantissas of the third floating-point number may be skipped.

For example, if the FMA apparatus 100 performs a multiply operation only, the processes that are performed by the carry save adder 120, the bit aligner 140, the sign determiner 131 and the complement generator 150, may be skipped. Therefore, it is possible to simplify the operation of the FMA apparatus 100, increase the processing speed of the FMA apparatus 100, and reduce the power consumption of the FMA apparatus 100.

Referring back to FIG. 1, the FMA apparatus 100 further includes a normalizer 160, a rounding determiner 170, a comparator 180, a fourth selector 175, and a fifth selector 185.

The normalizer 160 may normalize the second bit-size mantissa that is stored in the storage 151 into a third bit-size mantissa. For example, the third bit size may be the same as or greater than the size in bits of the mantissa of a double-precision number. As an example, the third bit size may be 52. If the second bit-size mantissa stored in the storage 151 is 161 bits long, it may be realigned to the third bit size. The normalizer 160 may transmit the third bit-size mantissa to the fourth selector 175.

The rounding determiner 170 may determine whether the second bit-size mantissa has been rounded up during the normalization to the third bit size. The IEEE 754 standard defines four rounding modes: round to nearest, round to zero, round to positive infinity, and round to negative infinity. The rounding mode of the second bit-size mantissa may be determined internally. For example, the rounding determiner 170 may determine whether the second bit-size mantissa has been rounded up in the internally determined rounding mode during the normalization to the third bit size.

If it is determined that the second bit-size mantissa has been rounded up during the normalization to the third bit size, the rounding determiner 170 may transmit a predefined third bit-size mantissa to the fourth selector 175. The rounding determiner 170 may also transmit round-up information that indicates whether the second bit-size mantissa has been rounded up during its normalization to the third bit size to the comparator 180.

The fourth selector 175 may include a demultiplexer that receives two inputs and provides a single output. For example, the fourth selector 175 may receive two mantissas, for example, the third bit-size mantissa provided by the rounding determiner 170 and the third bit-size mantissa provided by the normalizer 160, and may select one of the two mantissas based on the round-up information provided by the rounding determiner 170. The fourth selector may output the selected mantissa to the fifth selector 185. For example, if the round-up information indicates that the second bit-size mantissa has been rounded up during its normalization to the third bit size, the fourth selector 175 may output the third bit-size mantissa provided by the normalizer 160.

Before the normalization of the second bit-size mantissa to the third bit size, the comparator 180 may determine whether to perform post-normalization. For example, the comparator 180 may determine whether the LSBs of the second bit-size mantissa stored in the storage 151 are each one, for example, by comparing the LSBs of the second bit-size mantissa with second bit-size data stored therein that has all bits set to one.

The comparator 180 may receive the round-up information from the rounding determiner 170. If the LSBs of the second bit-size corresponding to the third bit size are all one, and if the round-up information indicates that the second bit-size mantissa has been rounded up during its normalization to the third bit size, the post-normalization may be performed. For example, before the normalization of the second bit-size mantissa to the third bit size, the normalize 160 may determine whether post-normalization is to be performed based on the results of the comparison performed by the comparator 180. The comparator 180 may transmit post-normalization information to the fifth selector 185.

The fifth selector 185 may include a multiplexer that receives two inputs and that provides a single output. The fifth selector 185 may output one of the third bit-size mantissa provided by the fourth selector 175 and a third-bit size mantissa that has all bits set to zero based on the post-normalization information provided by the comparator 180. In this example, if the second bit-size mantissa has been rounded up during its normalization to the third bit size and the LSBs of the second bit-size mantissa are all zero, the bits of the resulting third bit-size mantissa may all become zero. Accordingly, the fifth selector 185 may determine whether post-normalization is to be performed, and may output a third bit-size mantissa that has all bits set to zero if post-normalization is expected to be performed.

Figure 2B:
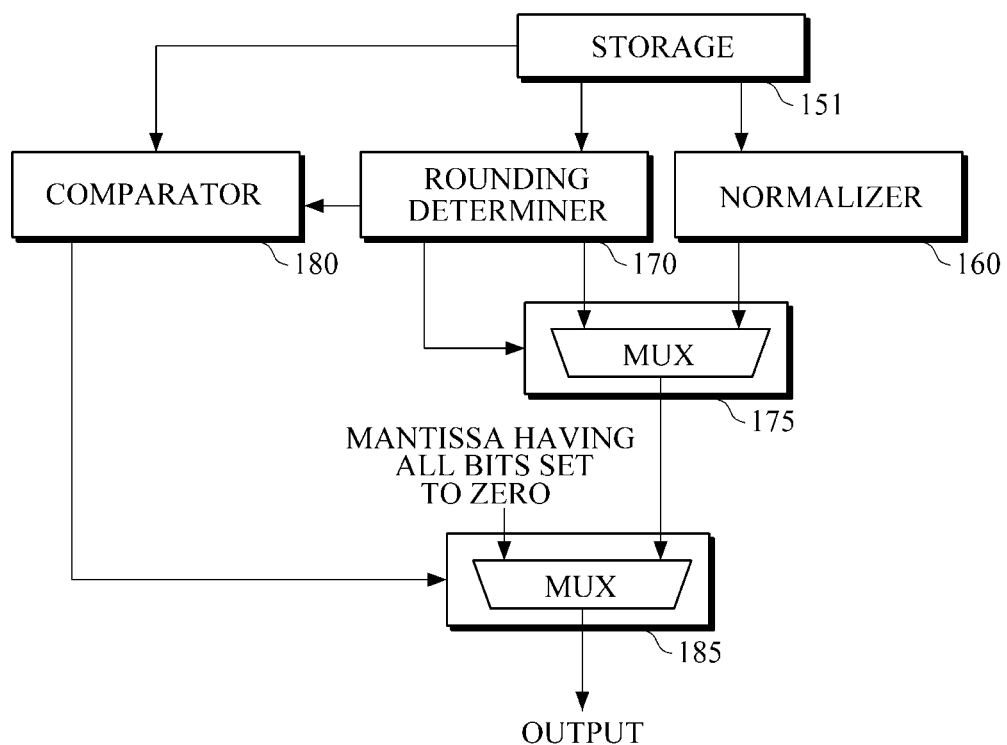
FIG. 2B is a diagram illustrating an example of a normalization module of a FMA apparatus.

FIG. 2B illustrates an example of a normalization module of an FMA apparatus.

Referring to FIG. 2B, the second bit-size mantissa stored in the storage 151 may be input to the comparator 180, the rounding determiner 170, and/or the normalizer 160. The comparator 180 may determine whether a number of LSBs of the second bit-size mantissa corresponding to the third bit size are all one. In this example, the comparator 180 may receive the round-up information from the rounding determiner 170. For example, if the LSBs of the second bit-size mantissa are all one and if the round-up information indicates that the second bit-size mantissa has been rounded up during its normalization to the third bit size, the comparator 180 may output the post-normalization information to the fifth selector 185.

The fourth selector 175 may receive third-bit size mantissas from the rounding determiner 170 and the normalizer 160, and may select one of the two third bit-size mantissas based on the rounding-up information. In this example, the fourth selector 175 may output the selected third bit-size mantissa to the fifth selector 185.

For example, the fifth selector 185 may select one of the third bit-size mantissa provided by the fourth selector 175 and a third bit-size mantissa that has bits all set to zero. For example, if the post-normalization information provided by the comparator 180 indicates that post-normalization is to be performed, the fifth selector 185 may output a third bit-size mantissa that has bits all set to zero. As another example, if the post-normalization information provided by the comparator 180 indicates that post-normalization is not to be performed, the fifth selector 185 may output the third bit-size mantissa provided by the fourth selector 175. In this example, because it is determined in advance whether post-normalization is to be performed, it is possible to improve the processing speed of the FMA apparatus 100.

Figure 3A:
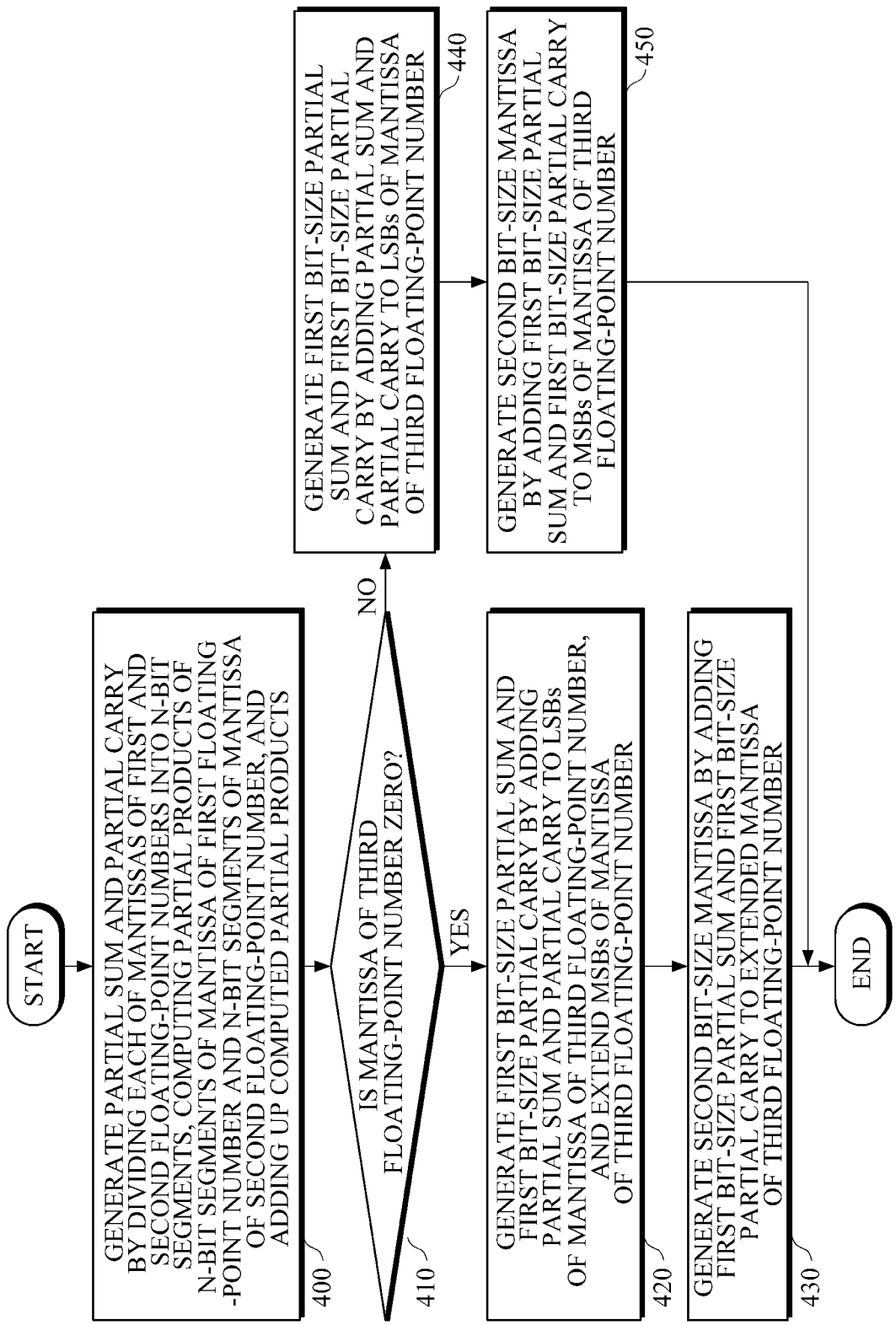
FIGS. 3A and 3B are flowcharts illustrating examples of FMA methods.
Figure 3B:
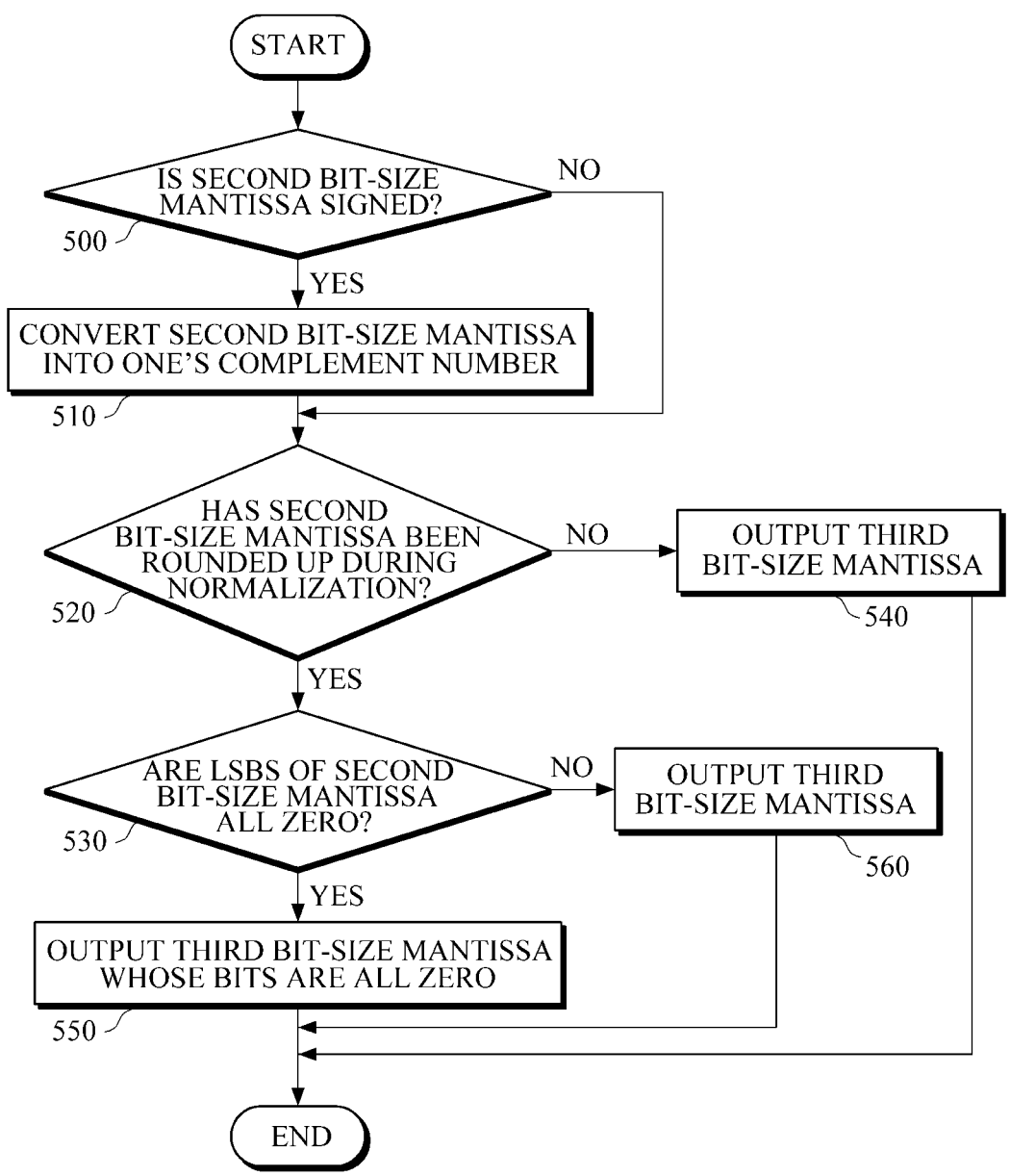

FIGS. 3A and 3B illustrate examples of an FMA method.

For example, FIG. 3A illustrates a multiply operation of the FMA method. Referring to FIG. 3A, a partial sum and a partial carry are generated by dividing each of the mantissas of first and second floating-point numbers into a plurality of n-bit segments, computing the partial products of the n-bit segments of the mantissa of the first floating-point number and the mantissa of the second floating-point number, and adding up the computed partial products, in 400. In 410, a determination is made as to whether the mantissa of a third floating-point number is zero. For example, an FMA may be performed by multiplying the first and second floating-point numbers and adding the third floating-point number to the result of the multiplication. If the mantissa of the third floating-point number is zero, only the multiplication of the first and second floating-point numbers may be performed. Thus, it is possible to prevent unnecessary addition by examining the mantissa of the third floating-point number in advance.

If the mantissa of the third floating-point number is zero, in 420 a first bit-size partial sum and a first bit-size partial carry are generated based on the partial sum and the partial carry, and the MSBs of the mantissa of the third floating-point number are extended. For example, the first bit size may be two times greater than the bit size a double-precision number.

In 430, the first bit-size partial sum and the first bit-size partial carry are added to the extended MSBs of the mantissa of the third floating-point number to generate a second bit-size mantissa. For example, the second bit size may be three times greater than the bit size of a double-precision number.

In the alternative, if the mantissa of the third floating-point number is not zero, in 440 a first bit-size partial sum and a first bit-size partial carry are generated by adding the partial sum and the partial carry to the LSBs of the mantissa of the third floating-point number. In 450, the first bit-partial sum and the first bit-size partial carry are added to the MSBs of the mantissa of the third floating-point number to generate a second bit-size mantissa.

FIG. 3B illustrates a normalization operation of the FMA method.

Referring to FIG. 3B, in 500 a determination is made as to whether the second bit-size mantissa obtained by the multiply operation of FIG. 3A is signed or unsigned. If the second bit-size mantissa is signed, in 510 the second bit-size mantissa is converted into its complement number. Because a floating-point number is represented in sign magnitude, it is necessary to convert a signed floating-point number into its complement number.

In 520, the second bit-size mantissa is normalized to a third bit size, and it is determined whether the second bit-size mantissa has been rounded up during the normalization process. If it is determined in operation 520 that the second bit-size mantissa has not been rounded up during the normalization process, in 540 a third-bit size mantissa obtained by the normalization process is output. The third bit size may be the same as or greater than the size in bits of the mantissa of a double-precision number. In the alternative, if it is determined in operation 520 that the second bit-size mantissa has been rounded up during the normalization process, in 530 it is determined whether the LSBs of the second bit-size mantissa are all zero.

If it is determined in operation 530 that the LSBs of the second bit-size mantissa are all zero, in 550 a third bit-size mantissa that has all bits set to zero is output. On the other hand, if it is determined in operation 530 that not all the LSBs of the second bit-size mantissa are zero, in 560 a predefined third bit-size mantissa is output.

In various aspects, described is a method of simplifying fused multiply-add operation. An example of a floating point operation is an operation that computes the product of two floating-point numbers (i.e., B and C) and adds the result of the computation to another floating-point number (i.e., A).

As described herein, when A=0, only the product of B and C may be computed, and thus, no addition is required. As another example, when C=1, there is no need to compute the product of B and C, and thus, no multiplier may be computed.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fused multiply-add (FMA) apparatus comprising:
a partial product generator configured to generate a partial sum and a partial carry by dividing each of the mantissas of first and second floating-point numbers into a plurality of n-bit segments, computing partial products of the n-bit segments, and adding up the computed partial products;
a carry save adder configured to generate a partial sum that has a first bit size and a partial carry that has the first bit size by adding the partial sum and the partial carry to the least significant bits (LSBs) of a mantissa of a third floating-point number;
a carry select adder configured to generate a mantissa that has a second bit size by adding the first bit-size partial sum and the first bit-size partial carry to the most significant bits (MSBs) of the third floating-point number; and
a first selector configured to transmit the partial sum and the partial carry to the carry save adder or the carry select adder based on whether the mantissa of the third floating-point number is zero.

2. The FMA apparatus of claim 1, further comprising:
a bit aligner configured to align the mantissa of the third floating-point number to the second bit size, output the LSBs of the mantissa of the third floating-point number to the carry save adder, and output the MSBs of the mantissa of the third floating-point number to the carry select adder;
a bit extender configured to extend the MSBs of the mantissa of the third floating-point number and output the extended MSBs to the carry select adder; and
a second selector configured to transmit the mantissa of the third floating-point number to the bit aligner or the bit extender based on whether the mantissa of the third floating-point number is zero.

3. The FMA apparatus of claim 1, further comprising:
a sign determiner configured to determine whether the second bit-size mantissa is signed or unsigned;
a complement generator configured to convert the second bit-size mantissa into its complement number if the second bit-size mantissa is signed;
a storage configured to store the second bit-size mantissa therein; and
a third selector configured to transmit the second bit-size mantissa to the complement generator or the storage based on whether the mantissa of the third floating-point number is zero.

4. The FMA apparatus of claim 3, further comprising:
a normalizer configured to generate a mantissa that has a third bit size by normalizing the second bit-size mantissa stored in the storage to a third bit size;
a rounding determiner configured to determine whether the second bit-size mantissa has been rounded up during the normalization performed by the normalizer, wherein, if the second bit-size mantissa has been rounded up during the normalization performed by the normalizer, the rounding determiner outputs a predefined third bit-size mantissa; and
a fourth selector configured to select one of the third bit-size mantissa provided by the normalizer and the third bit-size mantissa provided by the rounding determiner.

5. The FMA apparatus of claim 4, further comprising:
a comparator configured to determine whether a number of LSBs of the second bit-size mantissa are all one and whether the second bit-size mantissa has been rounded up during the normalization performed by the normalizer; and
a fifth selector configured to select one of the third bit-size mantissa selected by the fourth selector and a third-bit size mantissa having all bits set to zero, based on the results of the determination performed by the comparator.

6. The FMA apparatus of claim 5, wherein the third bit size is the same as or greater than the bit size in of a mantissa of a double-precision number.

7. The FMA apparatus of claim 1, wherein the first bit size is two times greater than the bit size of a double-precision number.

8. The FMA apparatus of claim 1, wherein the second bit size is three times greater than the bit size of a double-precision number.

9. The FMA apparatus of claim 1, wherein the partial product generator is further configured to transmit the partial sum and the partial carry to the first selector.

10. A fused multiply-add (FMA) method comprising:
generating a partial sum and a partial carry by dividing each of the mantissas of first and second floating-point numbers into a plurality of n-bit segments, computing partial products of the n-bit segments, and adding up the computed partial products;
determining whether the mantissa of a third floating-point number is zero; and
if the mantissa of the third floating-point number is zero,
generating a partial sum that has a first bit size and a partial carry that has the first bit size by adding the partial sum and the partial carry to the LSBs of the mantissa of the third floating-point number,
extending the MSBs of the mantissa of the third floating-point number, and
generating a mantissa that has a second bit size by adding the first bit-size partial sum and the first bit-size partial carry to the extended MSBs,
wherein the generating of the partial sum and the partial carry, and the generating of the mantissa that has the second bit size are performed at a processor.

11. The FMA method of claim 10, further comprising:
determining whether the LSBs of the second bit-size mantissa are all one;
normalizing the second bit-size mantissa to a third bit size and determining whether the second bit-size mantissa has been rounded up; and
if the LSBs of the second bit-size mantissa are all one and the second bit-size mantissa has been rounded up, outputting a mantissa having the third bit size and that has all bits set to zero.

12. The FMA method of claim 11, wherein the third bit size is the same as or greater than the bit size of a mantissa of a double-precision number.

13. The FMA method of claim 10, wherein the first bit size is two times greater than the bit size of a double-precision number.

14. The FMA method of claim 10, wherein the second bit size is three times greater than the bit size of a double-precision number.

15. The FMA method of claim 10, further comprising:
if the mantissa of the third floating-point is not zero, generating the partial sum that has the first bit size and the partial carry that has the first bit size by adding the partial sum and the partial carry to the LSBs of the mantissa of the third floating-point number.

16. The FMA method of claim 15, further comprising:
if the mantissa of the third floating-point is not zero, generating the mantissa that has the second bit size by adding the first bit-size partial sum and the first bit-size partial carry to the LSBs of the mantissa of the third floating-point number.

17. A fused multiply-add (FMA) apparatus comprising:
a partial product generator configured to generate a partial product and a partial carry based on a mantissa of a first floating-point number and a mantissa of the second floating-point number;
a carry save adder configured to add the partial sum and the partial carry to one or more least significant bits (LSBs) of a third floating-point number to generate a first bit-size partial sum and a first bit-size partial carry;
a carry select adder configured to add the partial sum and partial carry to one or more most significant bits (MSBs) of the third floating point number or adds the first bit-size partial carry and the first bit-size partial sum to the one more MSBs of the third floating-point number, to generate a second bit-size partial sum and a second bit-size partial carry;
a storage configured to temporarily store the second bit-size partial sum and the second bit-size partial carry; and
a selector configured to receive a signal that indicates whether the LSBs of the third floating-point number are zero, and determine whether to transmit the partial sum and the partial carry to the carry save adder or the carry select adder based on the received signal.

18. The FMA apparatus of claim 17, wherein if the selector receives a signal that indicates the LSBs of the third floating-point number are all zero, the selector is further configured to skip the carry save adder and transmit the partial sum and the partial carry to the carry select adder.

19. The FMA apparatus of claim 17, wherein if the selector receives a signal that indicates the LSBs of the third floating-point number are not all zero, the selector is further configured to transmit the partial sum and the partial carry to the carry save adder.

20. The FMA apparatus of claim 17, wherein the carry save adder is a 3 to 2 carry save adder.

* * * * *